July 18, 1939.  B. DICK  2,166,804
BRAKING SYSTEM
Filed March 11, 1937  2 Sheets-Sheet 2
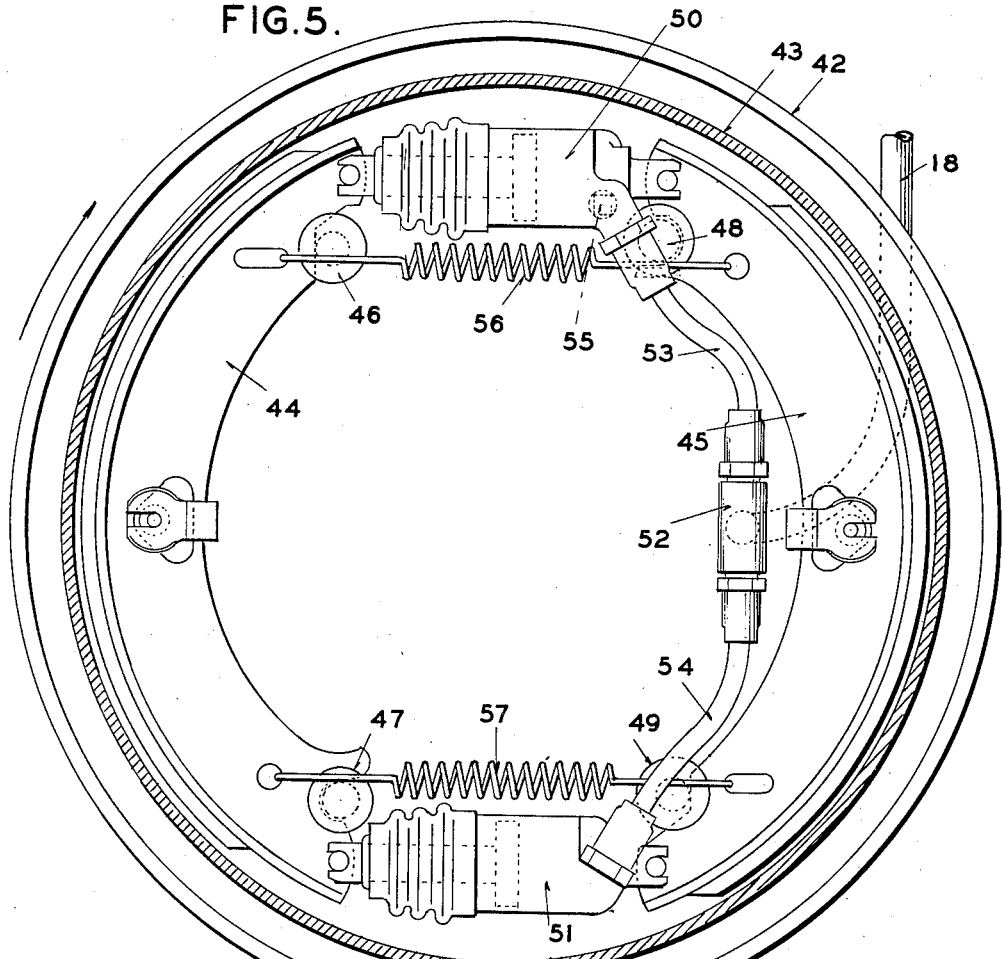
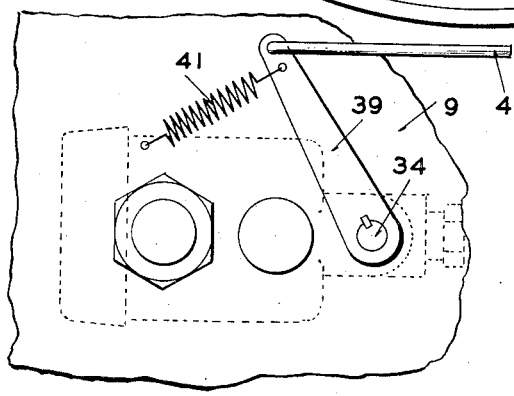
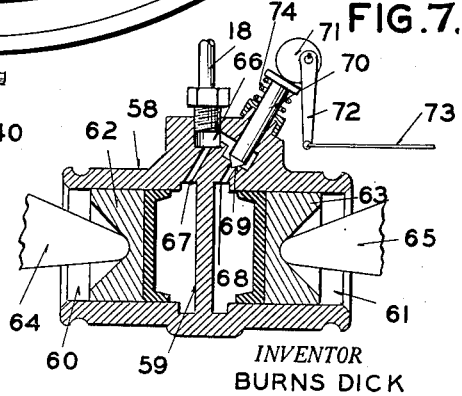
INVENTOR
BURNS DICK
BY
E. E. Huffman
ATTORNEY Patented July 18, 1939

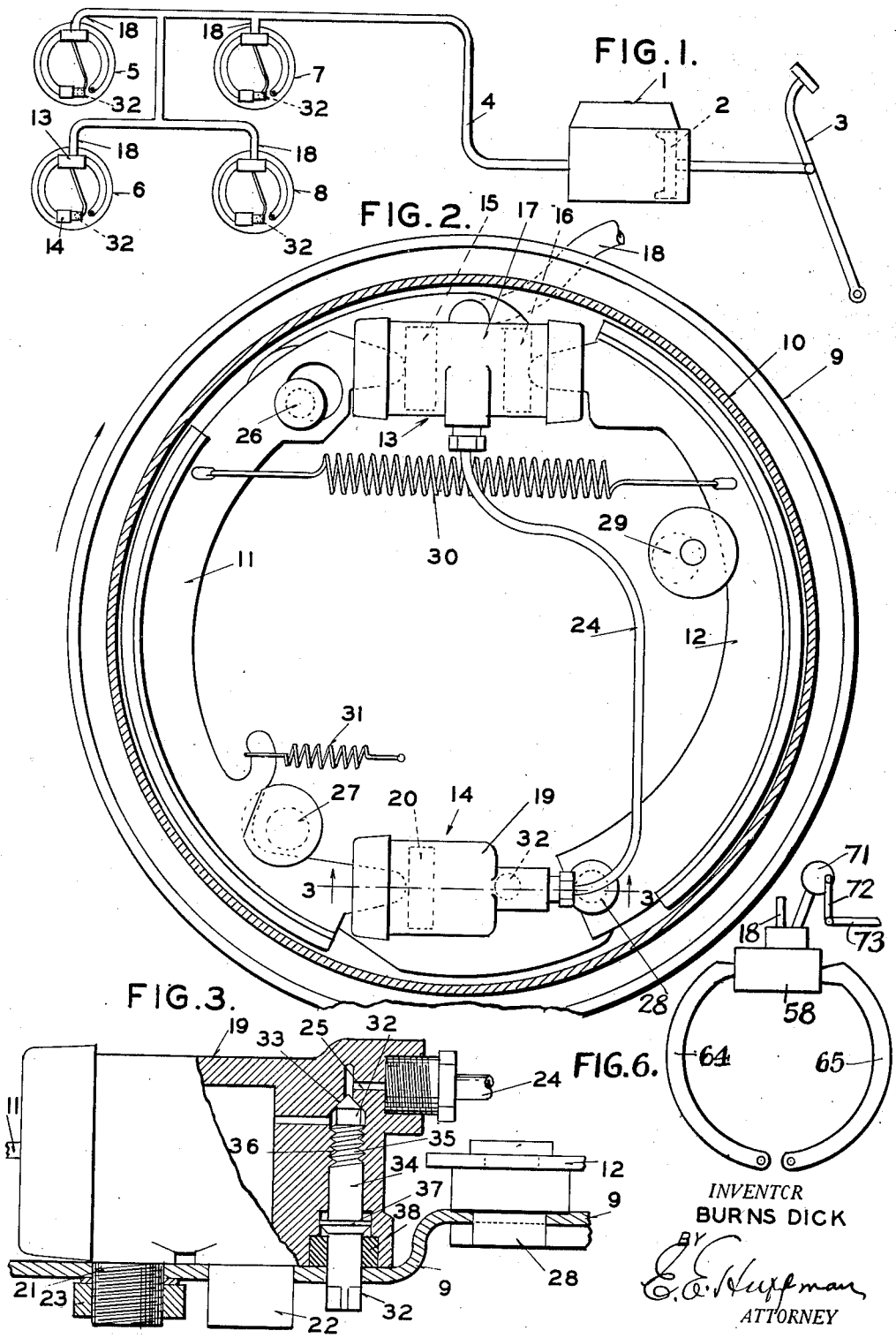

2,166,804

UNITED STATES PATENT OFFICE 2,166,804

BRAKING SYSTEM

Burns Dick, Ferguson, Mo., assignor to Wagner Electric Corporation, St. Louis, Mo., a corporation of Delaware Application March 11, 1937, Serial No. 130,237

12 Claims. (Cl. 188—152)

My invention relates to a braking system for a vehicle and more particularly to an improved braking system which will permit variation of the torque output of a brake or of several brakes to compensate for different coefficients of friction between the vehicle wheel or wheels and the road surface resulting from changing road surfaces and loads carried by the vehicle.

Increase in road speeds and in torque output of brakes has increased the hazards of operation on slippery and icy highways since rotation of the vehicle wheels, particularly the front wheels, may be stopped by considerably less than normal maximum brake pressure. This results in a front wheel skid and in steering difficulty. Because of these undesirable braking effects, it has been proposed to completely disable the brakes on the front wheels for driving on roads having a slippery surface, it being considered that it was safer to eliminate the entire added braking effect of these brakes rather than take a chance on a front wheel skid and loss of control of the vehicle. This proposal, of course, is not the desired ultimum because of the complete loss of the braking effect of the front wheels.

Due to the effect during stopping of a vehicle, which is equivalent to actual forward shifting of the load, the usual practice is to so design brakes that approximately sixty per cent of the total braking torque is developed at the front wheels, except that in heavier trucks where the greater portion of the load is over the rear wheels, the braking torque may be made the same on front and rear wheels, or in instances, greater at the rear.

It is the general object of my invention to provide means whereby the vehicle operator may readily make adjustments resulting in suitable variation in the relation of braking torque at the front wheels to that at the rear wheels and, specifically, may reduce the braking effect on the front wheels to avoid the hazards hereinabove referred to, thus maintaining them effective to assist, to a substantial extent, in retardation and stopping of the vehicle or, specifically, may reduce the braking effect on either set of wheels to compensate for varying load conditions during braking on dry roadways.

Other objects of my invention will become apparent from the following description taken in connection with the accompanying drawings in which Figure 1 is a schematic view of a fluid-actuated braking system embodying my invention; Figure 2 is an enlarged view of one of the front wheel brakes; Figure 3 is a cross-sectional view taken on the line 3—3 of Figure 2, showing the cutout valve for disabling one of the fluid motors; Figure 4 is a view showing how the cutout valve can be manually-actuated from a remote point; Figure 5 is a view of a different type of brake embodying a cutout valve for disabling one of the fluid motors thereof; Figure 6 is a view of a pivoted two-shoe brake assembly embodying my invention; and Figure 7 is an enlarged cross-sectional view of the single-unit double-piston fluid motor employed for actuating the shoes of the brake and embodying means for disabling one of the pistons thereof.

I have disclosed my invention as being embodied in hydraulically-actuated brakes but it may also be employed in mechanical brakes. Referring to Figures 1, 2, and 3, in Figure 1, I have shown a schematic view of one form of my improved braking system which broadly comprises a master cylinder device or compressor 1 having a piston 2 actuated by the brake pedal 3 and connected by fluid conducting conduits 4 to the fluid motors of the forward wheel brakes 5 and 6 and the rear wheel brakes 7 and 8, four brakes only being shown although a greater number may be employed, depending upon the type of vehicle upon which the system is employed.

In the system disclosed in Figure 1, all the brakes are of identical construction, one being shown in detail in Figures 2 and 3. This brake comprises the usual backing plate 9 secured to a fixed part of the vehicle and enclosing a drum 10 fastened to the vehicle wheel. Two brake shoes 11 and 12 are positioned within the drum in end-to-end relation, these shoes having mounted thereon the usual brake linings to provide a friction surface for cooperation with the inner surface of the drum.

The actuating means for the brake shoes comprises two separate hydraulic actuating motors 13 and 14 interposed between the adjacent ends of the shoes. The motor 13 is of the two-piston type having pistons 15 and 16 mounted in the cylinder 17 for cooperation with the ends of shoes 11 and 12. The cylinder is secured to backing plate 9 by suitable means and provided with an inlet which is connected to the hydraulic lines 4 by conduit 18 in a well-known manner. The hydraulic motor 14 is of the single-piston type and comprises a cylinder 19 having one closed end and a piston 20 therein. The cylinder, as best shown in Figure 3, is provided with two integral projections 21 and 22 which are received in openings in backing plate 9. The projection 21 is provided with threads and employed as the means for clamping the motor to the backing plate, the clamping means being shown as a nut 23 which cooperates with the threaded projection. The motor 14 is connected for intercommunication with motor 13 by means of a conduit 24, the connection with motor 14 being by way of passage 25 in the closed end of cylinder 19 (Figure 3).

The shoe 11 has associated therewith an anchor pin 26 at its end adjacent hydraulic motor 13 and also an adjustable anchor pin 27 at its end adjacent motor 14. The brake shoe 12 has associated therewith a single anchor pin 28 which is positioned at the end of the brake shoe adjacent the single-piston motor 14. This brake shoe also has cooperating therewith an adjustable stop 29 for determining its "off" position with respect to the drum when the brake shoes are retracted from the drum by the action of the retractile spring 30 connected to both of the shoes and positioned just below motor 13. A retractile spring 31 is also employed to retract the lower end of shoe 11 from the drum and against the adjustable anchor pin 27.

Referring to the operation of the brake, it is first assumed that drum 10 is rotating in the direction of the arrow which corresponds to the forward direction of the vehicle. If the master cylinder device 1 is now operated to apply the brakes, fluid under pressure will be transmitted to hydraulic motor 13 by way of conduits 4 and 18 and also to hydraulic motor 14 by means of the interconnecting conduit 24. This will cause the two fluid motors to simultaneously apply pressure to the brake shoes, the two adjacent ends which are operated by fluid motor 13 being moved into engagement with the drum by pistons 15 and 16 and the end of shoe 11 which is operated by fluid motor 14 being moved into engagement with the drum by piston 20. When the shoes engage the drum, they will have a tendency to be carried with the drum in the direction of its rotation, and shoe 11 will, therefore, anchor against anchor pin 26 and shoe 12 will anchor against anchor pin 28. Since the anchor for each shoe under these conditions is located at the remote end of the shoe with respect to the direction of rotation of the drum, the maximum braking torque of each shoe is utilized and there is produced a two-shoe brake in which both shoes act as "forward" shoes in the forward direction of the vehicle.

When the brake is rotating in the direction opposite that indicated by the arrow and the shoes are applied to the drum by means of hydraulic motors 13 and 14, shoe 11 will anchor on adjustable pin 27 and shoe 12 will be held in engagement with the drum and against its anchor pin 28 by means of piston 16 of hydraulic motor 13. Under these conditions the brake operates in the same manner as an ordinary two-shoe brake in which two of the adjacent ends of the shoes are expanded and the other adjacent ends are anchored. The shoe 12 will not transfer any actuating force through hydraulic motor 13 to shoe 11.

In accordance with my invention I have provided each brake with a cutout valve whereby it is possible to decrease the braking efficiency of each brake when the drum is rotating in the direction indicated by the arrow, this cutout valve being so embodied in the system that it will completely disable the single-piston motor 14.

Referring to Figure 3, the cutout valve is generally indicated by the reference character 32 and comprises a valve seat 33 in passageway 25 between cylinder 19 and conduit 24 and a cooperating valve stem 34 mounted in the closed end of the cylinder. The surface of seat 33 is conical and the end of valve stem 34 which cooperates therewith is also conical. In order to provide means for opening and closing the valve, the valve stem is formed with threads 35 which cooperate with threads 36 in the bore in which the valve stem is positioned. Also in order to prevent leakage past the valve stem when the valve is open, the valve stem is formed with a shoulder 37 which is adapted to cooperate with an annular rubber washer 38 when the valve stem is withdrawn. The outer end of valve stem 34 extends through backing plate 9 and is formed with a square head in order that it may be operated by a suitable tool, thus permitting the valve to be opened and closed as desired.

When valve 32 is closed, it is impossible for fluid under pressure to be transmitted from the master cylinder device 1 to hydraulic motor 14 to cause its piston 20 to act upon brake shoe 11. Under these conditions motor 13 will be the only one acting upon the shoes and when fluid under pressure is transmitted thereto, it will expand the ends of brake shoes 11 and 12. The brake shoe 11 will anchor upon anchor pin 27, and brake shoe 12 will be forced against anchor pin 28. The brake will now have the same torque output as an ordinary two-shoe brake in which one shoe acts as a "forward" shoe and the other a "reverse" shoe. The torque output of the brake for a given pressure will be substantially decreased by approximately forty or fifty per cent, depending, of course, upon the distance the anchor pins are from the drum, the length of the shoes, and so forth.

With a brake such as that illustrated in Figures 2 and 3 employed in a vehicle braking system having a brake upon all four wheels, for example, and it is found desirable to decrease the torque output of the front wheel brakes, it is only necessary to close the cutout valve 32 upon each of the front wheel brakes 5 and 6. When the master cylinder device is now operated to apply the brakes and the vehicle is moving in a forward direction, the torque output of the front wheel brakes 5 and 6 will be substantially less than the torque output of the rear wheel brakes 7 and 8, which is very desirable when the vehicle is being operated upon a wet or slippery highway and the friction between the tires of the wheels and the roadway surface is considerably less than such friction under dry road conditions.

When the vehicle is heavily loaded and the pavement is dry, it may be found desirable to have the torque output of the front wheel brakes greater than that of the rear wheel brakes due to the transfer of a portion of the load from the rear wheels to the forward wheels during braking. To have a greater torque output on the front wheel brakes than on the rear wheel brakes under these conditions, it is only necessary to close cutout valve 32 of each rear wheel brake 7 and 8, thereby decreasing the torque output of these brakes a substantial amount. The braking system now becomes fairly well balanced for the load and road conditions which are being encountered by the vehicle.

When the road conditions and the vehicle load are such that it may be found desirable to reduce the torque output of each brake of the vehicle an equal amount, then it is only necessary to close the cutout valve 32 for each brake, thus changing each brake from one having two "forward" shoes in the forward direction of rotation of the wheels to a brake having one "forward" shoe and one "reverse" shoe.

Referring to Figure 4, I have shown means whereby the cutout valve 32 may be controlled from a remote point. The portion of valve stem 34 which extends to the exterior of backing plate 9 has secured thereto an operating lever 39 connected to a rod or flexible wire 40 leading to a remote point, as for example, the operator's compartment of the vehicle. A spring 41 is also employed to normally maintain the valve stem in a position wherein the valve is open.

Referring to Figure 5, I have disclosed another brake which can be employed in my novel braking system to secure the same results as are secured by means of the brake shown in Figures 2 and 3. The backing plate or support 42 encloses the open side of drum 43 and within the drum and supported on the backing plate are two brake shoes 44 and 45. The shoe 44 is provided with an anchor pin 46 at one of its ends and an anchor pin 47 at its other end. The shoe 45 is provided with an anchor pin 48 at one of its ends and an anchor pin 49 at its other end. The shoes are in end-to-end relation and interposed between one pair of adjacent ends is the fluid motor 50 and interposed between the other pair of adjacent ends is the fluid motor 51. Both of these fluid motors are of the floating type and each comprises a cylinder and a single piston, the cylinder being connected to the end of one shoe and the piston to the end of the other shoe in a well-known manner to thus expand the ends of the shoes into engagement with the drum when fluid under pressure is transmitted to the fluid motor.

The supply conduit 18, which is connected to the master cylinder device through conduit 4, is connected with a junction member 52, one end of which is connected to a flexible conduit 53 leading to the closed end of the cylinder of fluid motor 50 and the other end of which is connected to a flexible conduit 54 leading to the closed end of the cylinder of fluid motor 51. The passageway through the closed end of the cylinder of fluid motor 50, which is employed to connect the interior of the cylinder with conduit 53, is provided with a cutout valve 55 of a construction similar to that of cutout valve 32 previously described in detail. The brake shoes are held in retracted position against their respective anchors by the retractile springs 56 and 57.

In this brake, when cutout valve 55 is open, both fluid motors 50 and 51 will be operated when fluid under pressure is transmitted thereto by the master cylinder device and, therefore, both pairs of adjacent ends of the shoes will be expanded into engagement with the drum. If the drum is rotating in the direction indicated by the arrow, which is considered the direction of rotation corresponding to the forward movement of the vehicle, shoe 44 will anchor against anchor pin 46 and shoe 45 will anchor against anchor pin 49. Both shoes will now act as "forward" shoes in the same manner as the shoes of the brake disclosed in Figure 2. When the drum is rotating in the reverse direction and the fluid motors are operated by the master cylinder device, shoe 44 will anchor upon anchor pin 47 and shoe 45 will anchor upon anchor pin 48. Under these conditions, both shoes will also act as "forward" shoes in the same manner as they would in the direction of rotation indicated by the arrow.

If it is desired to reduce the torque output of this brake for a given fluid pressure created by the master cylinder device, it is only necessary to close cutout valve 55. Under these conditions, fluid motor 51 will be the only one which is operated when the master cylinder device is actuated. The brake will now become an ordinary two-shoe type of brake in which only one pair of adjacent ends of the shoes are expanded, the other pair of adjacent ends anchoring upon anchor pins 46 and 48. Consequently, when the cutout valve is in closed position, the torque output of the brake will be reduced an amount which is substantially forty or fifty per cent of its normal torque output in the same manner as the brake in Figure 2 has its torque output reduced when cutout valve 32 is closed.

Referring to Figures 6 and 7, I have shown how my invention may be embodied in an ordinary two-shoe type of brake in which one pair of adjacent ends of the two brake shoes may have interposed therebetween a fluid motor and the other pair of adjacent ends are anchored to the backing plate. In place of the single fluid motor having oppositely moving pistons in a single cylinder, I substitute a cylindrical casing member 58 which is provided with a partition 59, thereby forming two axially-aligned cylinders 60 and 61. The cylinder 60 has reciprocable therein the piston 62, and cylinder 61 has reciprocable therein the piston 63, piston 62 being adapted to actuate the end of the pivoted brake shoe 64 and piston 63 being adapted to actuate the end of the brake shoe 65 of the two-shoe brake. The conduit 18, leading from the source of pressure, is shown as connected with casing member 58 and communicating with chamber 66 which is in communication with cylinder 60 by passageway 67 and with cylinder 61 by passageway 68. The passageway 68 is provided with a valve seat 69 for cooperation with the conical end of a valve stem 70 extending to the exterior of casing 58. The head of this valve stem cooperates with a cam member 71 controlled by an arm 72 and a rod 73 leading to the operator's compartment. The valve stem 70 is normally biased by a spring 74 to a position where it is off the valve seat.

When the valve stem is in its normal retracted position to open passageway 68, the fluid motors will operate in the same manner as an ordinary two-piston fluid motor without partition 59 therein. When it is desired to decrease the torque output of the brake, the valve stem is operated by cam 71, thereby shutting off passageway 68 and preventing any fluid under pressure from entering cylinder 61. When the valve is thus closed and the master cylinder is operated, fluid under pressure can only enter cylinder 60 and, consequently, only brake shoe 64 will be operated. Thus it is seen that the torque output of the brake will be decreased an amount corresponding to that normally produced by brake shoe 65 since this brake shoe is ineffective, not being moved into engagement with the drum to produce any braking action.

With a braking system embodying any of the brakes just described, it is readily seen that the braking torque of each brake may be so varied with respect to the braking torque of any of the other brakes that the vehicle can be properly controlled under varying road conditions and loads. If it is desired to reduce the torque output of one or both of the forward wheel brakes, it is only necessary to close the cutout valve or valves associated therewith and if it is desired to reduce the torque output of one or both of the rear wheel brakes, it is only necessary to close the cutout valve or valves which are associated with these brakes. When it is found desirable to reduce the torque output of all the wheel brakes, all the cut-out valves are closed.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a motor vehicle provided with a plurality of wheels, a brake for each wheel comprising a backing plate, a drum, a plurality of brake shoes cooperating with the drum and a plurality of intercommunicating fluid motors for operating the shoes, a source of fluid pressure connected to simultaneously operate all the fluid motors on all the brakes, valve means associated with each brake for disabling less than the total but at least one of the fluid motors thereof, and means for operating said valve means from the exterior of the backing plate.

2. In a motor vehicle provided with a plurality of wheels, a brake for each wheel comprising a backing plate, a drum, a plurality of brake shoes cooperating with the drum and a plurality of intercommunicating fluid motors for operating the shoes, a source of fluid pressure connected to simultaneously operate all the fluid motors on all the brakes, a valve associated with one of the fluid motors of each brake for causing said motor to be ineffective, an actuating element for said valve extending through the backing plate, and manually operable means for controlling said actuating element.

3. In a motor vehicle provided with front and rear wheels, a brake for each wheel and comprising a drum and cooperating friction means, fluid pressure-operated means for actuating the friction means of each brake, said means for each friction means of the front wheel brakes comprising a plurality of fluid motors, a source of fluid pressure connected to simultaneously operate all the fluid pressure-operated means, and manually-controlled means for varying the relation of the total braking torque which will be effective on the front wheels to the total braking torque which will be effective on the rear wheels for a given fluid pressure from said source, said last named means comprising means for causing less than the total but at least one of the fluid motors of each front wheel brake to be ineffective.

4. In a motor vehicle provided with a plurality of wheels, a brake for each wheel comprising a drum and cooperating friction means, a plurality of intercommunicating fluid motors for operating the friction means of each brake, a source of fluid pressure connected to operate all the fluid motors, and valve means associated with one of the fluid motors of each brake for preventing transmission of fluid under pressure thereto.

5. In a motor vehicle provided with a plurality of pairs of wheels, a fluid-actuated brake for each of said wheels comprising friction means and two intercommunicating fluid motors for actuating the friction means, a source of fluid pressure connected to operate all the fluid motors, and means for disabling at the will of the operator one of the fluid motors of each of the brakes which are associated with one pair of wheels.

6. In a motor vehicle provided with a plurality of pairs of wheels, a fluid-actuated brake on each of said wheels, each brake upon one pair of wheels embodying two intercommunicating fluid motors, a source of fluid pressure for operating all of said brakes, and means for disabling at the will of the operator one of the fluid motors of each brake of said one pair of wheels to thereby decrease the torque output of these brakes in comparison with the brakes on the other wheels.

7. In braking mechanism, the combination of a support, a brake drum, friction means mounted on the support and adapted to cooperate with the drum, a plurality of fluid motors for actuating different parts of said friction means, a conduit interconnecting the fluid motors, a source of fluid pressure connected to the fluid motors, and manually-controlled valve means for closing the conduit between the fluid motors and preventing one of said fluid motors from being operated by fluid pressure from said source.

8. In braking mechanism, the combination of a support, a brake drum, two brake shoes mounted on the support with one end of one brake shoe being adjacent an end of the other, two fluid motors for actuating the adjacent ends of the shoes and comprising a casing having two separate axially-aligned cylinders and a piston in each cylinder, a conduit connected to a source of pressure, a passage for placing each cylinder in communication with the conduit, and a manually-operated valve for closing the passage leading to one of the cylinders.

9. In braking mechanism, the combination of a support, a brake drum, a plurality of shoes mounted on the support in end-to-end relation and adapted to cooperate with said drum, means constituting an anchor for one end of each shoe when the drum is rotating in one direction, other means constituting an anchor for the other end of each shoe when the drum is rotating in the opposite direction, fluid motors interposed between the pairs of adjacent ends of the shoes for actuating the shoes into engagement with the drum, means for connecting said fluid motors for intercommunication, a source of fluid pressure connected to the fluid motors, and manually-controlled valve means for preventing one of said fluid motors from being operated by fluid pressure from said source.

10. In braking mechanism, the combination of a support, a brake drum, a plurality of shoes for cooperation with the drum and mounted on the support, a plurality of intercommunicating fluid motors for actuating said shoes into engagement with the drum, a source of fluid pressure connected to said fluid motors, and valve means for causing one of said fluid motors to be ineffective to thereby decrease the torque output of said brake for a given pressure from the source of fluid pressure.

11. In braking mechanism, the combination of a support, a brake drum, two brake shoes mounted within the drum in end-to-end relation, an abutment carried by the support and constituting an anchor for the end of one of the shoes when the drum is rotating in one direction, other abutments carried by the support and constituting an anchor for each end of the other shoe whereby said shoe will anchor at one end when the drum is rotating in one direction and at the other end when the drum is rotating in the opposite direction, fluid pressure means acting upon the free end of the first named shoe and the adjacent end of the other shoe, fluid pressure means acting upon the opposite end of the other shoe, means for simultaneously operating all of said fluid pressure means, and manually-controlled valve means for disabling one of the fluid pressure means.

12. In braking mechanism, the combination of a support, a brake drum, a pair of brake shoes within the drum, each having an end adjacent an end of the other, fluid pressure means for moving said adjacent ends of the shoes into engagement with the drum, means constituting an anchor for the other end of one of the shoes, means constituting an anchor for each end of the other shoe, fluid pressure means for actuating the other end of the other shoe into engagement with the drum, means for simultaneously supplying fluid under pressure to both of said fluid pressure means, and manually-controlled valve means for causing one of the fluid pressure means to be ineffective.

BURNS DICK.